United States Patent [19]

Mangrulkar

[11] Patent Number: 5,586,041

[45] Date of Patent: * Dec. 17, 1996

[54] METHOD AND SYSTEM FOR REAL-TIME STATISTICAL PROCESS MONITORING

[75] Inventor: Suresh M. Mangrulkar, Farmington Hills, Mich.

[73] Assignee: Ford Motor Company, Dearborn, Mich.

[ * ] Notice: The term of this patent shall not extend beyond the expiration date of Pat. No. 5,311,759.

[21] Appl. No.: 390,848

[22] Filed: Feb. 17, 1995

Related U.S. Application Data

[63] Continuation-in-part of Ser. No. 116,188, Sep. 3, 1993, Pat. No. 5,423,199, which is a continuation-in-part of Ser. No. 991,071, Dec. 14, 1992, Pat. No. 5,311,759.

[51] Int. Cl.$^6$ .............................. G06F 19/00; B21D 5/01
[52] U.S. Cl. .................. 364/474.16; 364/468.17; 364/472.01; 72/3; 72/17.3
[58] Field of Search ..................... 364/468, 469, 364/474.16, 184, 551.02, 552; 72/3, 12, 21

[56] References Cited

U.S. PATENT DOCUMENTS

| | | | |
|---|---|---|---|
| 3,779,731 | 12/1973 | Pollock et al. | 65/29 |
| 3,930,248 | 12/1975 | Keller | 340/267 R |
| 4,023,044 | 5/1977 | Miller et al. | 307/116 |
| 4,099,408 | 7/1978 | Ludwigson | 73/95 |
| 4,121,289 | 10/1978 | Stiel | 364/552 |
| 4,408,471 | 10/1983 | Gossard et al. | 72/21 |
| 4,510,570 | 4/1985 | Yonekura | 364/476 |
| 4,511,044 | 4/1985 | Conner et al. | 209/522 |
| 4,548,066 | 10/1985 | Martinez et al. | 73/1 J |
| 4,567,774 | 2/1986 | Manahan et al. | 73/826 |
| 4,633,720 | 1/1987 | Dybel et al. | 73/862.53 |
| 4,734,869 | 3/1988 | Mickowski | 364/550 |
| 4,750,131 | 6/1988 | Martinez | 364/476 |
| 4,758,964 | 7/1988 | Bittner et al. | 364/508 |
| 4,817,006 | 3/1989 | Lewis | 364/476 |
| 4,819,467 | 4/1989 | Graf et al. | 72/8 |
| 4,852,397 | 8/1989 | Haggag | 73/82 |
| 4,987,528 | 1/1991 | O'Brien | 364/184 |
| 5,271,254 | 12/1993 | Gloe et al. | 72/19 |
| 5,288,968 | 2/1994 | Cecil | 219/89 |
| 5,297,478 | 3/1994 | Jartyn et al. | 100/35 |
| 5,311,759 | 5/1994 | Mangrulkar et al. | 72/12 |
| 5,423,199 | 6/1995 | Mangrulkar | 72/3 |
| 5,440,478 | 8/1995 | Fisher et al. | 364/188 |
| 5,491,647 | 2/1996 | O'Brien et al. | 364/551.02 |

FOREIGN PATENT DOCUMENTS 1299711  12/1989  Japan .

Primary Examiner—Roy N. Envall, Jr.
Assistant Examiner—Thomas E. Brown
Attorney, Agent, or Firm—Joseph W. Malleck; Roger L. May

[57] ABSTRACT

Method and system for monitoring the operation of a machine having a traversing tool or die member, based on a plurality of features extracted from a process signature. The method includes defining the plurality of features, each feature representing a parameter associated with the process of forming the parts, and operating the machine so as to produce a predetermined number of production parts while collecting a production operating signature. The method also includes extracting the feature values from the production operating signature to obtain production feature values, and comparing the production feature values to predetermined operating limits which represent limits within which acceptable parts are formed.

16 Claims, 13 Drawing Sheets

TO PLANT NETWORK

| FILE SETUP [RUN] SIGNATURE REVIEW SYSTEM | | | 15:46:14 |
|---|---|---|---|

| Baseline Data | Baseline Hit 30 | | Signal | Mean | Stand. Dev. |
|---|---|---|---|---|---|
| OT | 200.684 | tons | OT | 210.522 | 20.394 |
| OTLR% | -3.56204 | % | OTLR% | -3.904 | 15.446 |
| OTRR% | 34.0085 | % | OTRR% | 11.521 | 15.137 |
| OTLF% | 14.8394 | % | OTLF% | 17.266 | 12.399 |
| OTRF% | -45.2859 | % | OTRF% | -24.883 | 17.093 |
| IT | 143.305 | tons | IT | 165.080 | 20.188 |
| ITLR% | 62.1734 | % | ITLR% | 0.322 | 27.468 |
| ITRR% | -78.4898 | % | ITRR% | -15.772 | 24.127 |
| ITLR% | -22.0517 | % | ITLR% | 12.764 | 22.868 |
| ITRF% | 38.3681 | % | ITRF% | 2.686 | 21.705 |
| OW | 401.367 | tons-in | OW | 421.843 | 40.788 |
| IW | 286.61 | tons-in | IW | 330.159 | 40.375 |
| IWLR% | 124.347 | % | IWLR% | 0.645 | 54.936 |
| IWRR% | -156.98 | % | IWRR% | -31.544 | 48.254 |
| IWLR% | -44.1035 | % | IWLR% | 25.528 | 45.737 |
| IWRF% | 76.7361 | % | IWRF% | 5.372 | 43.410 |
| | | | CT | 1.500 | 0.010 |
| Return -- New Test, Esc -- Main Menu | | | RU | -0.000 | 0.298 |

↑ 36        *Fig. 4a*        ↑ 38

MANUFACTURING PROCESS MONITORING GEAR BROACHING

OVERVIEW

TOOL # _____

PART # _____

TOTAL CYCLE COUNT # _____

VIOLATIONS: CONTROL _____ QUALITY _____

| TOTAL WORK | ☐ |
|---|---|
| ROUGH | ☐ |
| FINISH-1 | ☐ |
| FINISH-2 | ☐ |

CYCLE TIME ☐

OTHER FEATURES ☐

CUTTING TEETH -- ROW #

Fig. 11

METHOD AND SYSTEM FOR REAL-TIME STATISTICAL PROCESS MONITORING

RELATED APPLICATION

This application is a continuation-in-part of U.S. patent application Ser. No. 08/116,188, filed Sep. 3, 1993, now U.S. Pat. No. 5,423,199 which is a continuation-in-part of Ser. No. 991,071, filed Dec. 14, 1992, now U.S. Pat. No. 5,311,759, issued May 17, 1994, both of which are herein incorporated by reference in their entirety.

TECHNICAL FIELD

The present invention relates to process monitoring and, more particularly, to real-time statistical process monitoring for a machine having a traversing tool or die member.

BACKGROUND ART

Sheet metal remains the primary material utilized in the making of an automobile body, despite the advent of plastics technology. Sheet metal body parts, such as fenders and quarter panels, are formed utilizing conventional stamping presses. In an effort to minimize operating cost and maximize part quality, it is desirable to monitor operation of these presses, so as to ensure the process remains within statistical control. It would also be desirable to monitor operation of any machine having one tool or die member being movable relative to a part or to another die member, including extrusion machines, broaching machines, die casting machines, injection molding machines, etc. In die casting and injection molding, it would be desirable to monitor movement of the screw of plunger during injection. All of the above-mentioned processes are in need of improved process monitoring.

For example, U.S. Pat. No. 4,750,131, issued to Martinez, discloses a method of detecting non-conforming parts in a progressive die press having a plurality of forming stations, each of which includes a forming tool and a force transducer. The method includes the steps of producing a preselected number of sample parts while collecting reference force data from the force transducers for a plurality of displacements. The reference force data and the displacement data are applied to a processor which produces a reference curve for each of the forming stations. Production force data are provided to the processor and compared to the curve for each of the displacements and for each of the forming stations. A non-conforming part is indicated when the production force data for at least one of the displacements is different from the reference force data of the reference curve by a preselected difference.

U.S. Pat. No. 4,987,528, issued to O'Brien, discloses a signature analysis control system for a stamping press. A reference signature corresponding to desired force values at particular sampling points during the RAM cycle is developed. The force signature for successive cycles of the press is then compared to the reference signature, and the press inhibited in the event that any sampling point deviates from the corresponding point in the reference signature by more than predetermined limits.

However, these existing systems and methods for monitoring manufacturing processes are rigid and inflexible in that they rely on one aspect, i.e. force amplitude, to detect problems. For example, the '131 patent teaches collecting reference and production force data to obtain reference and production force curves. The production force curve is then compared to the reference force curve, and difference beyond acceptable limits indicates flaws. Similarly, the '528 patent discloses controlling press operation based on comparisons between desired force amplitude values and actual force amplitude values. Reference and operational force signatures are generated from force signals and compared to each other to detect out-of-tolerance conditions. By limiting analysis to force amplitude, however, many aspects of the process can not be properly monitored. As a result, the process can go out of statistical control, even though the force amplitude may be in control. The problem goes undetected until the unacceptable parts that have been formed roll off of the line. Similarly, the process may be in control even though the force data is outside the reference envelope in some non-critical areas.

Because there are many factors which affect process control and part quality, it is most desirable to monitor press operation utilizing a plurality of variables which can be extracted from the press signature in real time.

SUMMARY OF THE INVENTION

It is an object of the present invention to provide an improved method and system for process monitoring of a machine operation or a machine having a traversing tool or die member which is movable relative to a part or the stationary die member. A machine having a traversing tool or die member will be understood to include a broaching process, a metal stamping process, an aluminum casting apparatus (having a movable plunger), an injection molding machine (having a movable screw), machining operations, etc.

It is also an object of the present invention to provide a method for real-time statistical process monitoring of a machine operation utilizing user-specified features extracted from a machine cycle signature.

In carrying out the above objects and other objects of the present invention, a method is provided for monitoring the operation of a stamping press or any machine having a traversing tool or die member. The method is also provided for monitoring movement of a screw or plunger in an injection molding machine or in an aluminum casting apparatus. The method comprises defining a plurality of features, each feature representing a parameter associated with the process of forming the parts, and operating the stamping press or other machine so as to produce a predetermined number of production parts while collecting a production operating signature. The method also comprises extracting feature values from the production operating signature in real time to obtain production feature values and comparing the production feature values to predetermined operating limits, the operating limits representing limits within which acceptable parts are formed. The method also comprises detecting the formation of unacceptable parts based on the comparison.

A system is also provided for carrying out the method.

The advantages accruing to the present invention are numerous. For example, because a plurality of user-specified features are monitored, many different problems can be diagnosed and/or detected earlier than with existing systems. Additionally, consistency of stampings or other parts is improved, thereby improving the overall fit and finish of the automobile body parts or other part applications. This also results in tangible cost savings derived from reduced scrap and rework. Analysis of the process signatures according to the present invention flags impending maintenance requirements, thus proactive maintenance of equipment is facilitated. Still further, process drifts are identified quickly, reducing machine down time. Process monitoring according to the present invention also improves the confidence of first-run capabilities and provides manufacturing flexibility.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 4a–4b are an illustration of screen displays for use with the present invention, illustrating a plurality of features extracted from a press signature and the associated diagnostic statistical process control charts;

FIG. 11 is an illustration of a screen display for manufacturing process monitoring of a gear broaching process in accordance with the present invention;

BEST MODE FOR CARRYING OUT THE INVENTION

Figure 1:
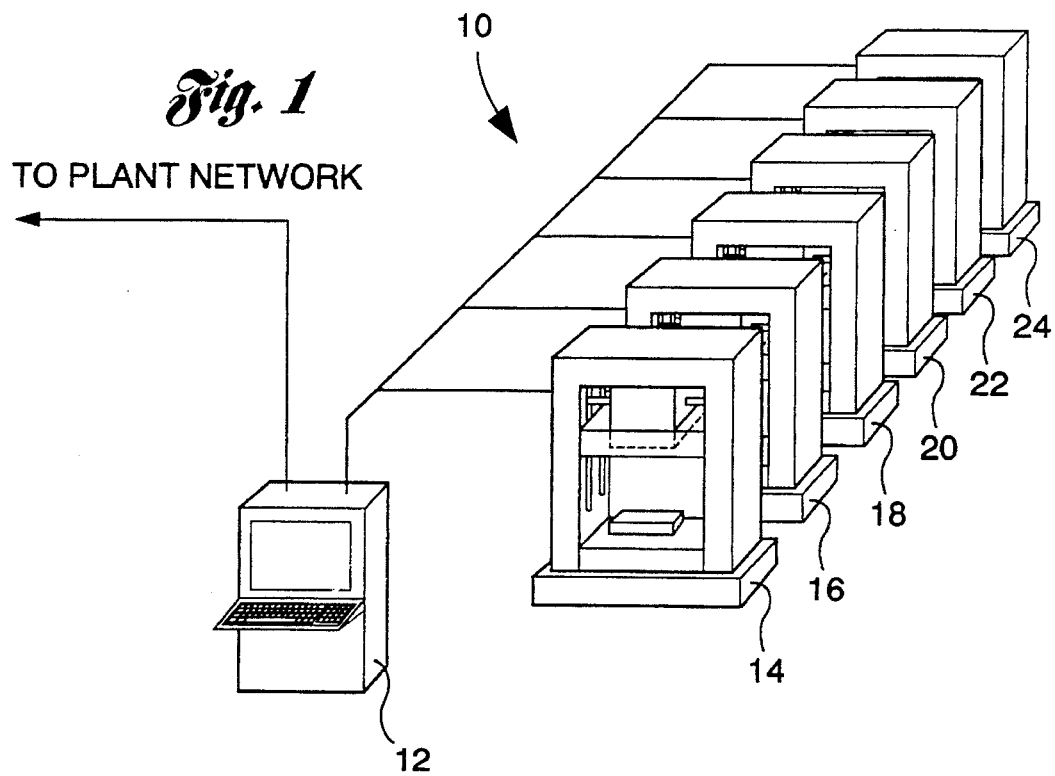
FIG. 1 is a perspective view of a typical press line including a process monitoring system for monitoring press operation according to the present invention.

Referring now to FIG. 1, there is shown a perspective view of a typical press line shown generally by reference numeral 10. As shown, the press line includes a plurality of presses 14–24, each for performing a certain metal forming operation on a blank of material during a production cycle. For example, the presses might sequentially perform the following metal forming operations: double-action draw, trim and pierce, cam flange/form/trim, cam flange/pierce, cam flange/pierce/restrike, and cam curl/pierce/form.

Figure 2:
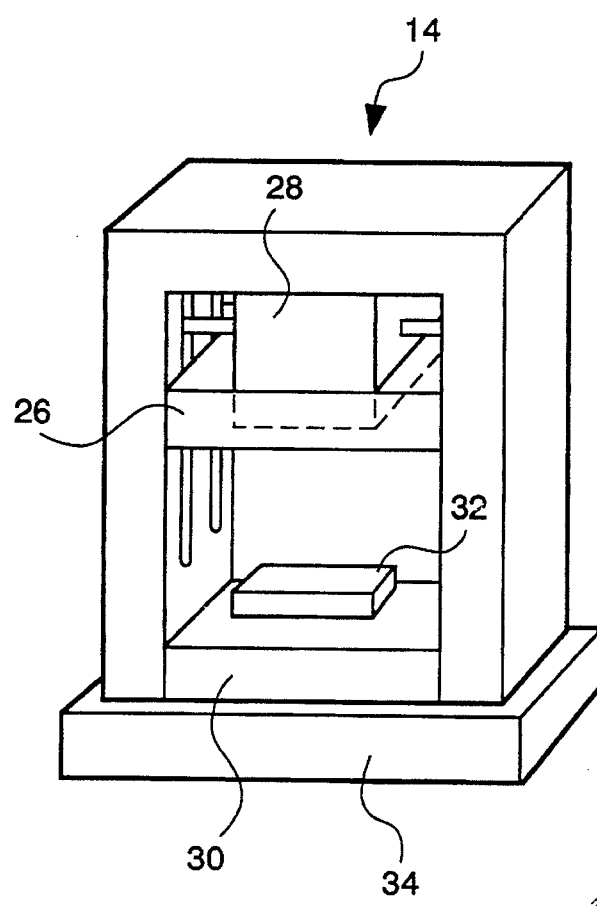
FIG. 2 is a perspective view of a press, such as a double-action draw press shown in FIG. 1.

As shown in FIG. 2, a double-action draw press 14 includes an upper binder 26, an upper punch 28, a lower binder 30 and a lower punch 32. Since the press 14 is typically an underdrive press, a motor (not specifically illustrated) is located under the press base 34. As is known, a plurality of pull rods are located in the press 14, extending upward from the motor to a crankshaft for moving the upper binder and upper punch in a downward direction. Strain gauges collect data during press operation and can be mounted at a number of locations on the press, such as the pull rods, the press columns or the pitman arms. Preferably, the strain gauges are mounted as close as possible to the stamping die. The press also includes an encoder not specifically illustrated for measuring the stroke positions of the two rams of the press. When a blank of material, such as sheet metal, is placed in the press 14, the upper binder is moved down and clamps the blank. The upper punch continues to move downward and, in cooperation with the lower punch, forms the part.

Referring again to FIG. 1, the press line also includes a process monitoring system 12. Although only one process monitoring system is shown, a plurality of process monitoring systems could be utilized. The process monitoring system 12 executes a monitoring program for monitoring operation of the individual presses 14–24 based on data received from the presses, such as from the strain gauges. The system also generates process control information, as described in greater detail herein below. In the preferred embodiment, the monitoring program is designed to allow a user to easily acquire data from a press or similar machine while monitoring the quality of the parts being produced. The monitoring program also enables the user to review the data in various formats, to create different experiments by varying acquisition parameters, and to store data efficiently. The user interface of the monitoring program makes use of screen windowing and manipulation routines. User selectable commands are organized into menus and sub-menus which are traversed with the aid of the cursor keys on a keyboard (not specifically shown), or other input device. The monitoring program, preferably written in the C computer language, makes use of a variety of libraries for general purpose functions, data analysis and graphic presentations, and the like. The monitoring program operates on any standard computer, such as an IBM or IBM compatible machine, equipped with an analog-to-digital (A/D) card for data acquisition, such as part number DAS16F, commercially available from Metrabyte. The computer also preferably has at least 640K of random access memory (RAM) and an EGA compatible color graphics card and monitor. A hard disk is preferred as the main storage media, as is a floating point co-processor, since much of the monitoring program is very computation oriented.

Figure 3:
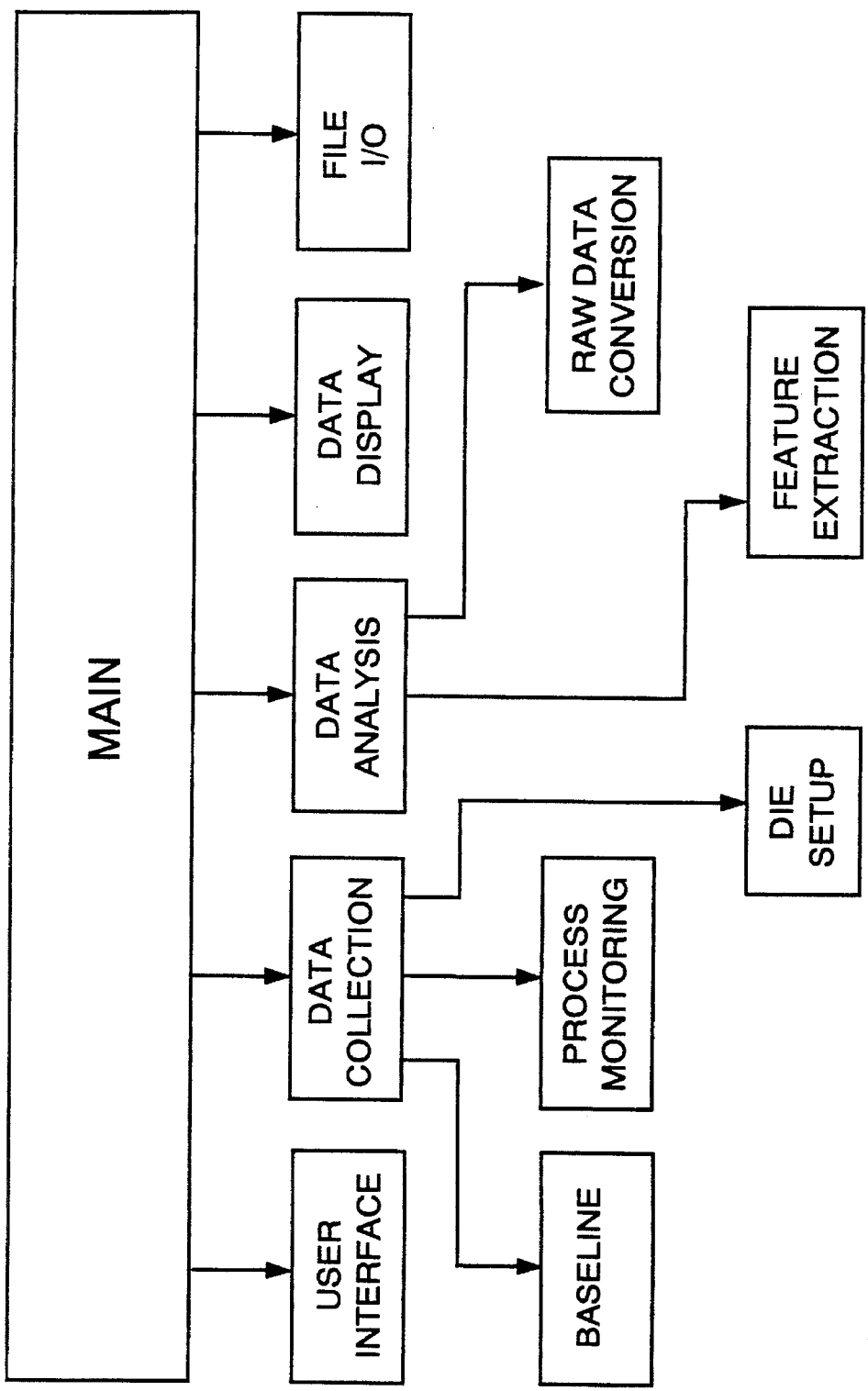
FIG. 3 is a block diagram of the major modules of the strategy of the present invention.

Referring now to FIG. 3, the monitoring program can be divided up into a plurality of major conceptual modules according to their function and association with a library of tools. These modules include the User Interface, Data Collection, Data Analysis, Data Display and File I/O. The User Interface module utilizes windowing and data entry displays and consists of a main menu with several sub-menu choices covering the range of functions available for manufacturing process monitoring according to the present invention. The sub-menu choices include Setup, System, File, Run, Signature and Review.

The Setup menu choice allows the user to modify and display any parameters or user-provided information necessary for data collection. Under Setup, the user can define the information which governs the statistical process monitoring. For example, the user can specify the sizes of baseline and subgroup samples, the reference part number, and the sigma ratios for control and quality limits. The user can also perform calibration operations under Setup, correcting raw voltage signals from sensors prior to conversion into engineering units. This allows the user to correct for possible drift in the voltages generated by the sensors or, to compensate for different types of sensor that provide a different output voltage. Preferably, the user is presented a menu displaying the analog reading, raw voltage, gain, offset, corrected voltage, and calculated reading in engineering units for each channel. Each channel represents a single input source to the system from a sensor on a press. The data from the channel is first converted by the A/D translation card to an associated analog data value (ADV), an unsigned 2-byte integer representation of the analog voltage signal from the sensor. Since the translation card has a 10 volt range with 12 bit resolution, the analog data value has a range of 0 to 4096, wherein 1 ADV represents 10/4096 volts.

Still further, the Setup routine allows the user to view and change the characteristics of each channel, by modifying the names, units and conversion equations. The user can also view and change the characteristic of the specified features by defining the desired features that will be extracted from the process signature. A feature, for purposes of this discussion, is a value extracted through direct measurement, or extracted through some form of computation from the data collected on one or more channels. Preferably, the features that are defined are those that directly affect the quality parameters of the part. For example, the maximum punch tonnage could be classified as a feature, since it might directly affect the quality of a character line on a fender. A feature should also have a physical significance relative to the process and/or be adjustable on the press. This facilitates press diagnostic and corrective action during an out-of-control (i.e. outside the quality limits) condition. For example, the maximum punch tonnage setting is also a setup parameter that is adjustable on the press if it is drifting out of control. Binder (i.e. outer) tonnage, punch (i.e. inner) tonnage, tonnage distribution around the press corners and nitro-pressure tonnage are typical examples of features that represent direct sensor measurements, whereas a parameter representing a variation in blank thickness, which may be computed from punch tonnage at various locations, is an example of a computed feature.

It will be appreciated by one of ordinary skill in the art that the ability to monitor process operation utilizing a plurality of features defined and specified by the user, instead of being restricted to the use of a single aspect (i.e. force amplitude) to detect problems as in the prior art, provides many advantages. For example, because a plurality of user-specified features are monitored, many different problems can be diagnosed and/or detected earlier than with existing systems. Additionally, consistency of stampings is improved, thereby improving the overall fit and finish of the automobile body parts. This also results in tangible cost savings derived from reduced scrap and rework. Analysis of the process signatures according to the present invention flags impending maintenance requirements, thus proactive maintenance of equipment is facilitated. Still further, process drifts are identified quickly, reducing press down time. Process monitoring according to the present invention also improves the confidence of first-run capabilities and provides manufacturing flexibility.

Different features can be utilized to diagnose and detect different problems. For example, monitoring peak tonnage between punch strokes can be utilized to detect functionality of the nitrogen cylinders of the press, whereas monitoring the work done by the die can be utilized to detect sheet blank material properties. As a result, the present invention provides the ability to diagnose and detect problems earlier than with existing systems. Additionally, for features, the user can modify names, units, baseline means and standard deviations, and can define upper and lower quality limits.

The Setup routine also allows the user to modify data acquisition parameters, such as the sampling rate and number of samples in each "hit" acquisition, and the pre- and post-triggers and their values for data acquisition as well as the trigger value for the offset. A "hit" represents the complete down and up movement of the inner and outer ram on the press. Still further, the Setup routine allows the user to activate/deactivate autosaving, to modify the number of hits per data file and to modify the number of files to save during process monitoring. The System menu selection encompasses commands available to perform DOS level functions by exiting the MPM monitoring program or creating a DOS shell.

Under the File menu selection, the user has access to all the available file manipulations in the MPM system. Various types of files exist, each containing different types of information, and are differentiated by the name of their extension.

Data File I/O handles both reading and writing of data files, which are preferably created automatically after a given number of hits, allowing the data acquisition to run for a long period of time unattended. Preferably, the data file stores not only the data itself, but also the settings that were current at the time of the file creation and the baseline that was used during process monitoring. After a data file has been read in successfully, other menu choices available, e.g. sub-menu Review, are enabled. In addition to reading and writing complete data files, the MPM system allows for both the reading and writing of single hit files.

Baseline File I/O handles both the reading and writing of baseline files, which are read in to serve as the basis for process monitoring, providing a reference point to judge whether features are above or below calculated limits. After the baseline data has been acquired, the system calculates averages, standard deviations, and the like for the features, and writes the same to an appropriate file. Preferably, the baseline file also stores the settings that were current at the time of writing the baseline file. Once the baseline file has been successfully read, Process Monitoring can begin, described in greater detail below.

Settings File I/O handles both the reading and writing of settings files. Preferably, the settings files contain the user-specified header information, the SPC parameters, acquisition parameters, autosave parameters, signal and feature names, gains and conversion data.

The Run menu choice of the User Interface is associated with the Data Collection module, which includes the Baseline and Process Monitoring sub-modules, as shown in FIG. 3. In the preferred embodiment, the Run menu choice includes five sub-menu choices: Baseline Data Acquisition; Process Monitoring; Manual Data Acquisition; Die Setup and Event Logging. Each becomes necessary during different situations which arise during data acquisition.

Baseline data acquisition reads the number of hits specified as the baseline sample size (e.g. 50), calculates related statistical information, such as mean and standard deviation, and also generates a single hit file for each hit. Since acquisition of baseline data is a prerequisite for selecting the Process Monitoring sub-menu choice, baseline data acquisition is normally run (or read from a file) at the beginning of a process monitoring session. Baseline generates a split screen: on the left, a feature screen, shown generally by reference numeral 36, is displayed containing the features of each hit; on the right, a means and standard deviations screen, shown generally by reference numeral 38, is displayed for each feature, as shown in FIG. 4a.

Prior to the start of actual production and process monitoring, the dies should be set up and properly aligned. During die setup, an appropriate setup file and a baseline file is read. Once the new die set is installed in the press and a part is made, the process monitoring system compares the single hit information to a reference baseline. If there is an out-of-limit condition, this will be visually highlighted and the operator should take corrective action. The above cycle is continued until the die is correctly configured. Typically, the limits for die setup are tighter than actual production control limits.

Figure 4B:
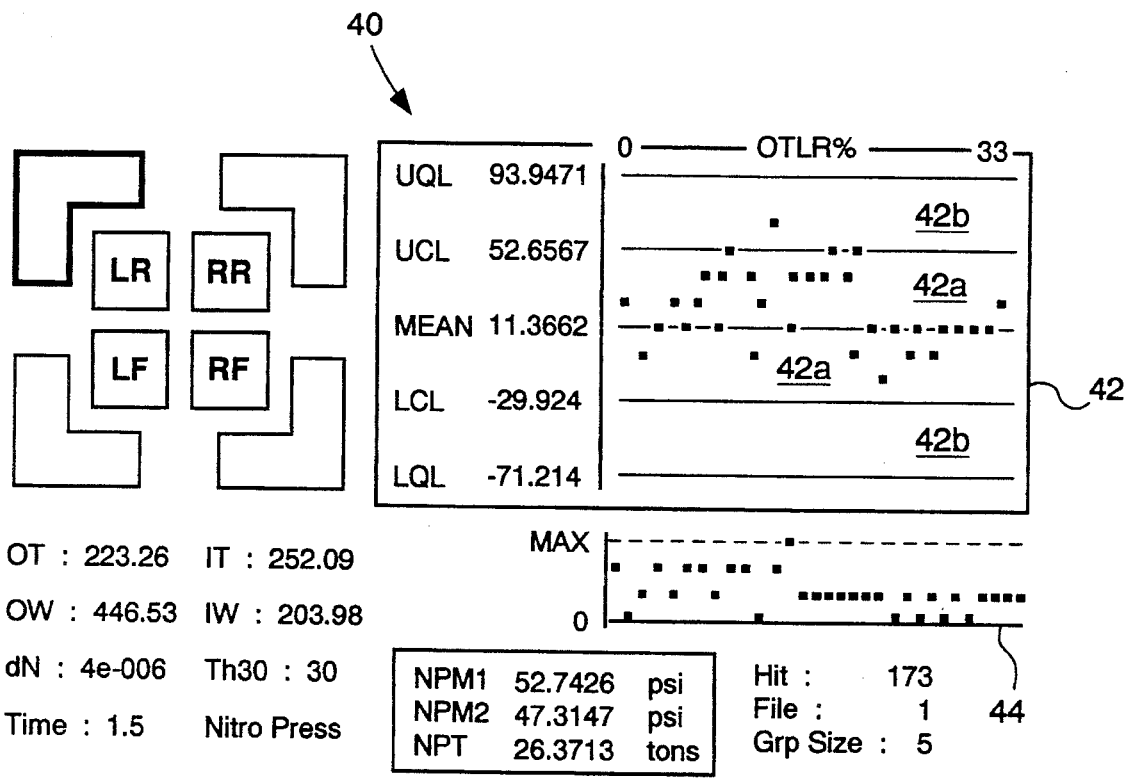

Process Monitoring, the most complex of the data acquisition routines, preferably generates a custom screen, shown generally by reference numeral 40, containing a block diagram of the press and a display of features, such as total tonnages and cycle time, as best shown in FIG. 4b. As shown, the block diagram of the press is divided into 20 sections, each of which represent the different inner and outer corners of the press and which are normally colored white. When a monitored feature is out of the specified operational limits, the box changes color. In the preferred embodiment, the operational limits include control limits and quality limits. During process monitoring, statistical process control charts, such as an X-bar chart, shown generally by reference numeral 42 in FIG. 4b, and an R-chart shown generally by reference numeral 44 in FIG. 4b, are generated and updated as data is collected, for each box displayed.

With continuing reference to FIG. 4b, the areas of the X-bar chart shown generally by 42a indicate a feature that is under control, and the areas of the chart shown generally by 42b indicate a feature that has exceeded the control limits, but is within quality limits (i.e. within acceptable tolerances). Exceeding the control limits signifies that the process is not in statistical control and is indicative of the presence of a special cause of excessive variation. For a process to be considered in control, all of the features should be in the control limits. Exceeding the quality limits signifies a process that will produce out-of-spec parts. The X-bar chart 42 of FIG. 4b shows the tonnage data collected during process monitoring for the left rear outer corner (OTLR) of the press, in relation to the control limits and quality limits determined based on the means and standard deviation associated with the previously collected baseline data.

Manual data acquisition is used primarily in diagnosing a problem with the press. During manual data acquisition, feature data from one press hit is collected and displayed in graphical format.

Under Event Logging, the MPM system monitors the current process run for a particular event, such as a tonnage value exceeding some predetermined limit. The user can select an event from a list of default events, or the user can specify his own event. When the MPM system has detected the occurrence of the specified event, a time stamp is recorded along with a description of the event in a file.

To begin data acquisition, the user specifies a channel to be monitored for the feature values that will begin and end the data acquisition (i.e. the pre- and post-triggers, respectively). In addition to the acquisition trigger values, tonnage offsets are determined. When the binder is unloaded and stopped (i.e. at about 356° of binder position), the four outer and the four inner corner tonnages are each preferably sampled ten times. An average for each of the eight corners is then calculated and these values become the tonnage offsets, which are then subtracted from the peak corner tonnages read during a hit. In the preferred embodiment, the pre- and post-triggers are established utilizing ram position of the outer binder, measured in inches. Once a manual hit is requested or a Baseline is run, the acquisition routines will continuously sample the specified channel until the pre-trigger value is found and data acquisition commences. Once the data acquisition pre-trigger point is found, the channels are continuously sampled until one of the following conditions is satisfied: memory overflow; the desired number of samples has been collected; or the post-trigger value is found.

The degree of accuracy this trigger method provides depends on how fast the voltage on the trigger channels changes, as well as the inherent speed of the data acquisition software and the machine on which it is running. Of course, there is a lapse between the time that the value on the channel is recognized to be the trigger value, and the time that the jump to the actual data collection routine is performed. In addition, there is a delay inherent in the data collection routine itself depending on how many channels are being sampled, and how fast the software is executing.

For example, if the pre-trigger point is set to the 4" mark on the binder downstroke, the first data point will typically be collected somewhere between 3.9" and 3.75". If the acquisition is allowed to run until the sample memory area is filled up, the post-trigger point can be determined with much greater precision, since the memory area can be searched to the exact point where the sampled value matches the post-trigger value. If a memory overflow condition occurs prior to detection of the post-trigger value, the data sample will be incomplete as far as to what the user desired. Most preferably, data collection continues after detection of the post-trigger value, assuming sufficient memory exists. The data stored is then truncated to the number of samples requested by the user or at the post-trigger value. This data is considered to be "raw" data and consists of a sequence [(# of channels)×sample size)] of integers (e.g. 2-byte values) stored successively in a memory area.

With continuing reference to FIG. 3, the Data Display module utilizes the Signature and Review menu selections. The Signature menu selection allows the user to access any of the channels recorded during one hit (Baseline or manual) and display the data graphically on the screen. Display options include allowing the user to plot channel data of up to four different signals at the same time, or allowing the user to correlate channel data against each other by providing the user with the capability of plotting one channel along the X-axis of the graph and another channel along the Y-axis. The latter option is particularly useful for visualizing the work curve with stroke versus tonnage.

The Review menu selection allows the user to plot hits and subgroups, display an alarm report and display SPC charts. The Plot option allows the user to select which type of data to review (i.e. baseline or actual process monitoring) and allows the user to specify up to three channels or features to plot. The channels are plotted on one set of axes, if possible, or on multiple graphs if not possible.

The Alarm report option displays any alarms associated with the current data file in memory. An alarm exists when a monitored feature has exceeded either the quality or control limits during process monitoring. The contents of an alarm report can vary to include the monitored feature, the time of day the feature exceeded the limits, and the like.

The SPC Chart option creates an SPC chart for a selected feature extracted from subgroup data. Preferably, the charts are created using lines which are color-coded based on the limits of the data: for example, the line plot representing the actual data is white; the mean of the feature is indicated by a yellow line; the upper and lower control limits are indicated by green lines; and the upper and lower quality limits are indicated by red lines. The display is "self-scaling", such that if the data is far outside the limits, the display will adjust so that both are displayed on the screen at the same time.

In the preferred embodiment, the SPC charts include two forms of control charts: X-bar charts and R-charts. These charts explain process data in terms of both spread (piece-to-piece variability) and location (process average). The X-bar chart is a measure for location and is the average of the values in a small subgroup. X-bar is the average for each subgroup and is determined by the following equation:

$$\overline{X} = \frac{X_1 + X_2 + \ldots + X_n}{n}$$

where $X_n$=a data point within the subgroup and n=a consecutive number of hits within a subgroup sample. Assume that for a stable production process, $X_n$ is normally distributed with production mean and standard deviation of $\mu$ and $\rho$, respectively. According to sampling theory, X-bar will be normally distributed with standard deviation of ($\sigma/\sqrt{n}$). The control limits (UCL, LCL) for the X-bar chart are, therefore, computed as follows:

$$UCL = \mu + \frac{y\sigma}{\sqrt{n}}$$

$$LCL = \mu - \frac{y\sigma}{\sqrt{n}}$$

where $\mu$=production mean, as determined from the Baseline data; $\sigma$=production standard deviation, as determined from the Baseline data; n=a consecutive number of hits within a subgroup sample; and y=default value of 3, for a 99.7% confidence level.

Exceeding the control limits is indicative of the process mean drifting out of control due to an attributable cause which needs to be corrected to bring the process back in control. Typically, this may be caused by drift in the die setup, steel from a different batch or supplier with a different characteristics, damage to the draw beads on the die, or the like. An out-of-control condition may not always affect the stamping quality. Therefore, in the preferred embodiment, provision has been made on the X-bar chart for the inclusion of quality limits. These limits are preferably determined experimentally to establish the effect of certain variables on stamping quality. These variables include process parameters such as binder tonnage settings, punch tonnage settings, nitro-pressure, inner/outer counter balance and the like. These variables also include steel parameters such as gage thickness, work hardening coefficient, blank size, and the like. These quality limits, when exceeded, will indicate a significant effect on stamping quality.

The R-Chart (or Range Chart), shown in FIG. 4b, is a measure for spread. Generally, it is represented by the range of the data within a subgroup sample. Due to the real-time computer capability of the MPM system, the range calculation is preferably replaced by calculated subgroup standard deviation as the representation of the data spread. Each subgroup data point is, therefore, determined by the following equation:

$$R = \sqrt{\frac{\Sigma (X_i - \overline{X})^2}{n}}$$

According to the sampling theory, for a given production variability and subgroup size, $R^2$ follows a $X^2$ distribution with (n–1) degrees of freedom. The upper control limit (UCL) for the R-Chart is, therefore, determined by the following equation:

$$UCL = \sqrt{\frac{\chi_{99}^2 * \sigma^2}{n}}$$

where $X^2_{99}$= the $X^2$ distribution with 99% confidence factor for n–1 degrees of freedom; $\sigma$=standard deviation derived from the baseline data; and n=subgroup size. Any out of range condition in the R-Chart will be indicative of change in process capability. This condition may not be correctable by shifting the process means by simply resetting the die, and may possibly require process or machine maintenance.

As shown in FIG. 3, analysis of the data collected includes Raw Data Conversion and Feature Extraction. Once the data has been sampled and stored in a memory area as the ADV value representation of the voltages seen on the channels, various features will be extracted from the raw data. As previously mentioned, features may be direct sensor measurements including conversion of the voltage representation to engineering units based on the range of the sensor that provided the voltage. Other features involve polynomial calculations to arrive at a value. An example includes a parameter representing variation in blank thickness. The following is a description of each feature preferably extracted from the raw data collected on each of the channels:

Total Outer Tonnage (OT)

The maximum ADV value is determined for each of the four outer corners of the die, then added together and multiplied by an appropriate conversion factor associated with the tonnage sensor.

Total Inner Tonnage (IT)

The maximum ADV value is determined for each of the four inner corners, then added together and multiplied by an appropriate conversion factor associated with the tonnage sensor.

OT Percentages (OLLR%, OLRR%, OLLF% OLRF%)

The maximum ADV value is determined for each of the four outer corners, then for each corner, the following calculation is performed:

$$OL\% = \left(\left(\frac{ADV_{MAX}}{OT}\right) * 400\right) - 100$$

IT Percentages (ILLR%, ILRR%, ILLF%, ILRF%)

The maximum ADV value is determined for each of the four inner corners, then for each corner the following calculation is performed:

$$IL\% = \left(\left(\frac{ADV_{MAX}}{IT}\right) * 400\right) - 100$$

Outer Work (OW)

For each corner, the tonnage value at each sample point is multiplied with the difference between the outer stroke at the sample point and the outer stroke at the next sample point, which is then added up. Then the work for the four corners are added together to obtain the total Outer Work.

Inner Work (IW)

For each corner, the tonnage value at each sample point is multiplied with the difference between the inner stroke at the sample point and the inner stroke at the next sample point, which is then added up. Then the work for the four corners are added together to obtains the total Inner Work.

Inner Work Percentages (IWLR%, IWRR%, IWLF%, IWRF%)

The work for each corner is calculated, then the percentages of total inner work is calculated as follows:

$$IW\% = \left(\left(\frac{CRNR_{WK}}{IW_{TOT}}\right)*400\right) - 100$$

Cycle Time (CT)

The cycle time is the time from detection of the pre-trigger (start of data acquisition) to the time the post-trigger was detected (end of data acquisition). In the preferred embodiment, cycle time is calculated as follows:

$$CT = \frac{T_S * N}{100}$$

wherein $T_S$ is the sample time and N represents the number of samples.

Inner Theta ($\theta_I$)

The theta value, expressed in degrees, describes the orientation of the inner load and is calculated as follows:

$$\Theta_I = \text{Arctan}\left\{\frac{ITRR\% + ITLR\%}{ITRR\% + ITRF\%}\right\}$$

Outer Theta ($\theta_O$)

The theta value, expressed in degrees, describes the orientation of the outer load and is calculated as follows:

$$\Theta_O = \text{Arctan}\left\{\frac{OTRR\% + OTLR\%}{OTRR\% + OTRF\%}\right\}$$

Inner Phi ($\Phi_I$)

Phi, expressed in degrees, describes the gradient for inner tonnage and is calculated as follows:

$$\Phi_I = \arctan\left\{\frac{(ILRR\% + ILRF\%)*\cos(\Theta_I)}{200} + \frac{(ILRR\% + ILLR\%)*\sin(\Theta_I)}{200}\right\}$$

Outer Phi ($\Phi_O$)

Phi, expressed in degrees, describes the gradient for outer tonnage and is calculated as follows:

$$\Phi_O = \frac{(OLRR\% + OLRF\%)*\cos(\Theta_O)}{200} + \frac{(OLRR\% + OLLR\%)*\sin(\Theta_O)}{200}$$

Nitrogen Pressure Max @0" OS (NPM)

The sample point where OS (outer ram) 0" is located and the ADV values for the two nitrogen pressures at that point are added and then converted to the proper engineering unit.

Other features could include work hardening coefficient, thickness of material, maximum nitrogen pressure tonnage, outer tonnages at particular downstrokes and maximum inner and outer tonnages.

Figure 5A:
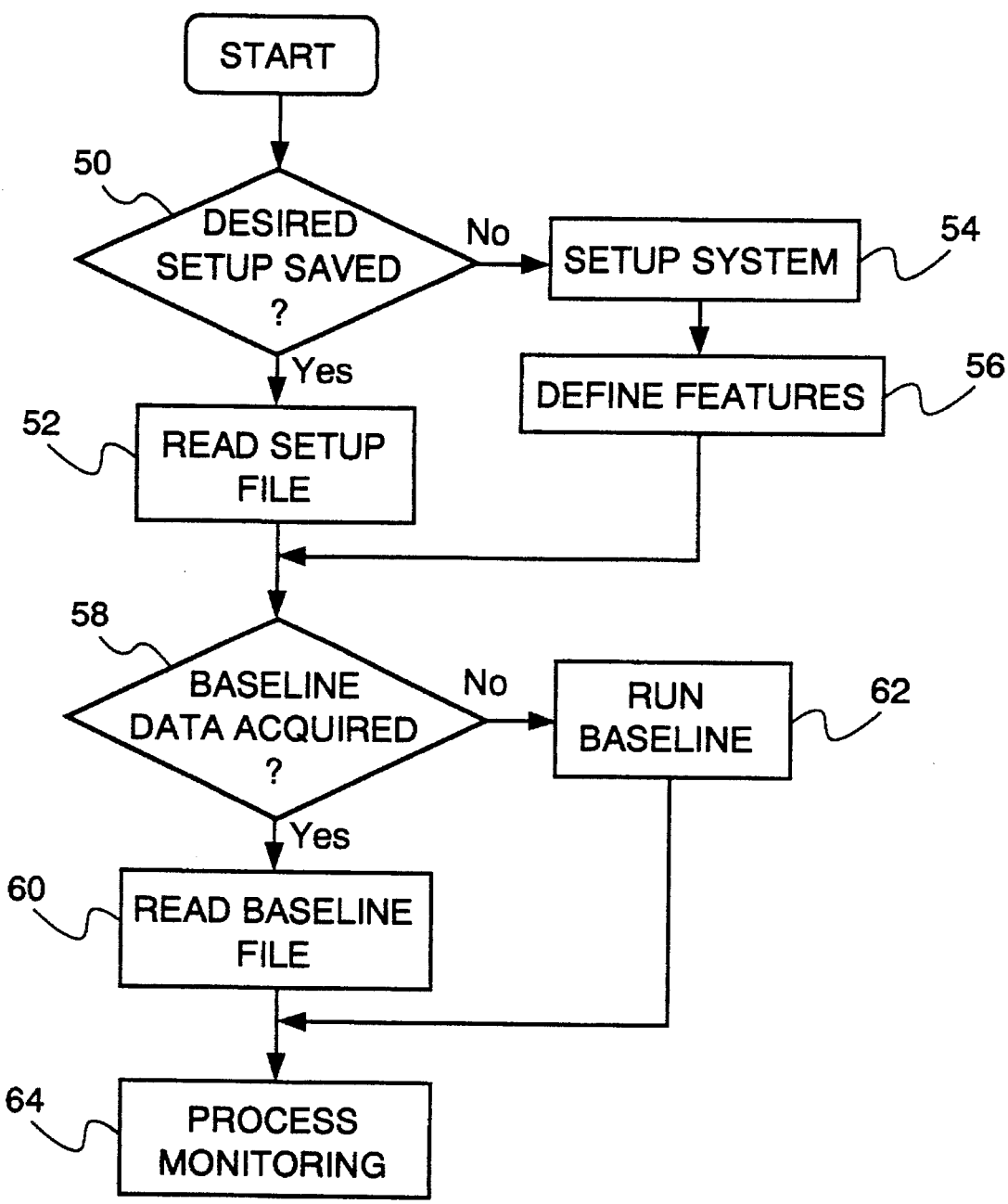
FIGS. 5a–5b are flowcharts detailing the process monitoring strategy of the present invention.
Figure 5B:
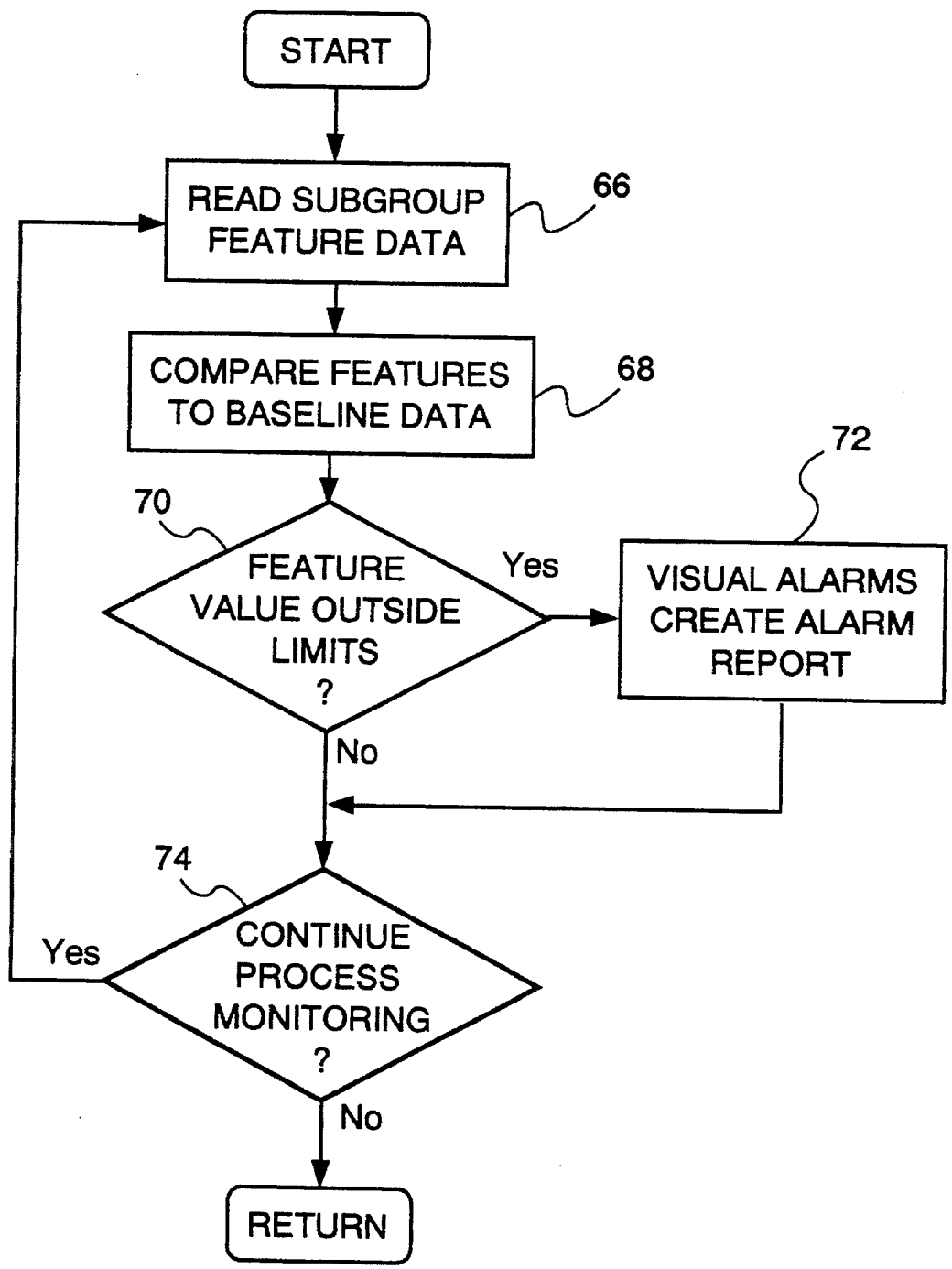

Referring now to FIGS. 5a–5b, there is shown a flowchart detailing the process monitoring strategy of the present invention, as executed by the process monitoring system 14 shown in FIG. 1. As shown, at step 50, the process monitoring system determines whether there is setup information saved. Prior to running process monitoring, features are defined and default settings of statistical process control parameters, acquisition parameters including test header information and the like are preferably set up and confirmed utilizing the Setup routine discussed above. If the desired setup information has been saved, at step 52 the appropriate setup file is accessed and read. If setup information has not been saved, at step 54 the user manually sets up the system by performing signal calibration procedures, specifying test header information and printer information, and inputting SPC, acquisition and autosave parameters, according to the Setup routine. During this setup, the user also defines the desired features at step 56 that will be extracted from the process signature during the baseline and process monitoring operations and saves them. The features preferably available, as discussed above, can include total tonnages, work and tonnage gradients.

As best shown in FIG. 5a, at step 58 the system determines whether baseline reference data has already been established. If it has, the appropriate baseline file is accessed and read at step 60. If baseline information does not already exist, at step 62 a baseline data acquisition procedure is executed. In the preferred embodiment, baseline execution includes acquiring a predetermined number of stamping hits and calculating process means and standard deviation for each specified feature. After the baseline has been saved, control limits and quality limits are calculated for each of the desired features of the selected subgroup sample size. In the preferred embodiment, the baseline is run when the process is stable, making good quality stampings uses blanks that are near the specification means and the press is running at the specified cycle time. The baseline data acquired is used as a reference for process monitoring during production, as described in greater detail below.

With combined reference to FIGS. 5a–5b, once the baseline data has been acquired, process monitoring is initiated at step 64. As best shown in FIG. 5b, at step 66 the press is operating and the process monitoring system acquires the subgroup feature data from a specified number of stamping hits (e.g. five). The subgroup feature data is then averaged and an associated SPC data point is plotted on an SPC chart (such as that shown in FIG. 4). At step 68, the features are compared to the baseline data, i.e. compared to the quality limits and the control limits determined from the baseline data. If the data point exceeds a quality limit or a control limit at step 70, the appropriate visual arm is initiated at step 72. As discussed above, this includes, where appropriate, modifying the color of the affected section of the press. Additionally, an appropriate alarm report is created and stored. If the user desires to continue process monitoring at step 72, steps 66–72 are repeated as described above and data will continually be acquired and selective process feature information will continue to be plotted on the X-bar and R-charts. Once the defined number of process monitoring data points are accumulated, the data will be automatically written to an appropriate data file so long as the autosave parameter has been activated.

Figure 6:
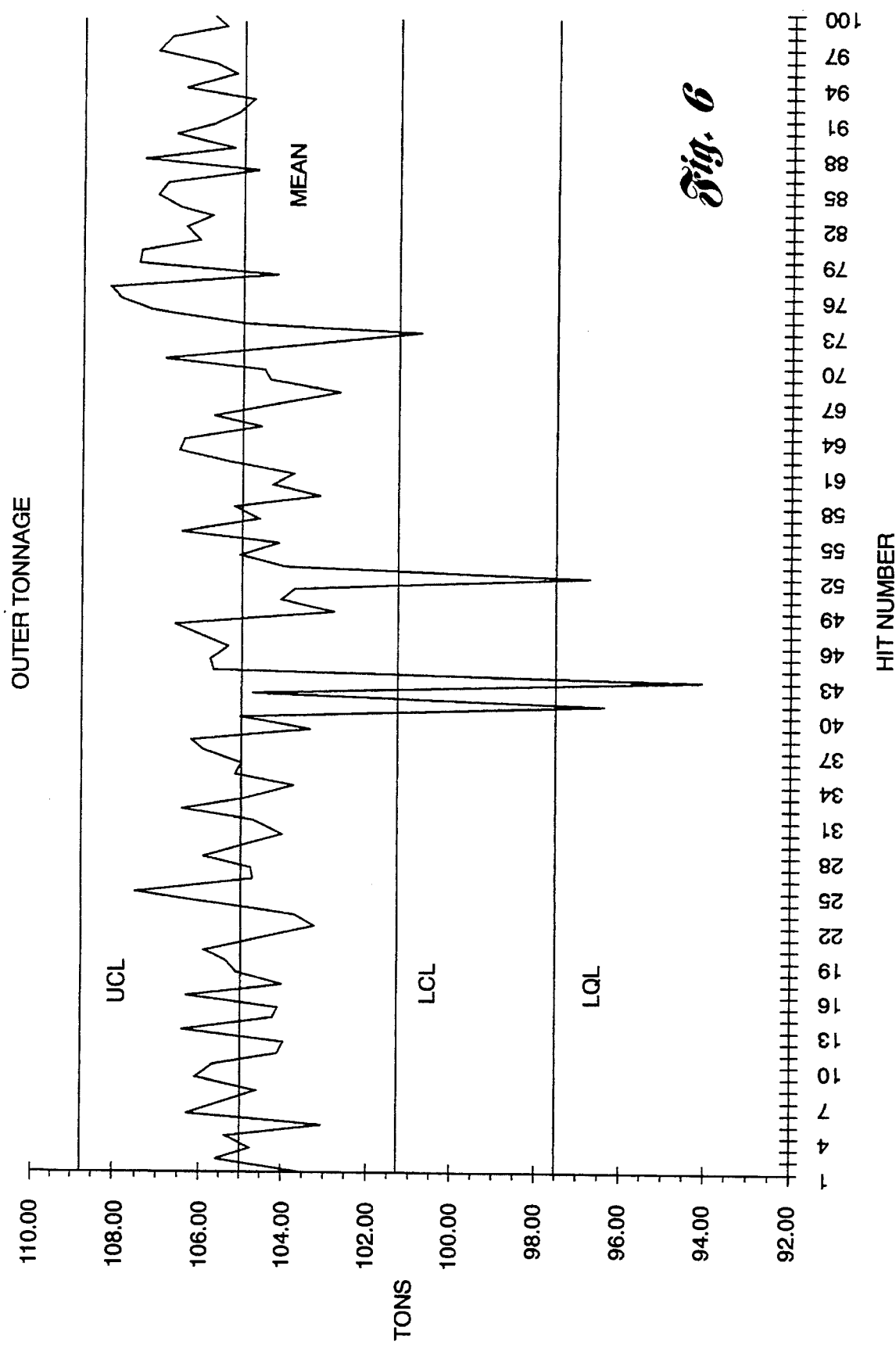
FIG. 6 is a graph illustrating diagnosis and detection of unacceptable parts based on process monitoring according to the present invention with the outer tonnage as the extracted feature.

Referring now to FIG. 6, there is shown a graph illustrating results achieved when utilizing the method and system of the present invention. FIG. 6 illustrates diagnosis and detection of unacceptable right front automobile fender panels based on process monitoring, with the outer tonnage as the extracted feature. The graph also includes the upper and lower control limits (LCL, UCL), the mean, and the lower quality limit (the upper quality is off scale). As shown, at hits #41–#43 and #52, the outer tonnage indicates the formation of unacceptable parts since the lower quality limit was exceeded, which without the present invention, would not be detected (visually confirmed) until the defective parts rolled off of the press line. However, between formation of the unacceptable part and visual detection, many other unacceptable parts will be formed, and therefore, scrapped. Utilizing the present invention, detection of problems is possible immediately after the first bad part was formed. Corrective action, such as stopping the press, can be taken much earlier than with existing systems, reducing scrap and costs.

The present invention may be applied to any machine operation having a traversing tool or die member, the traversing tool or die member may move relative to a part or stationary die member. A machine having a traversing tool or die member is herein defined to include a broaching process, a metal stamping process, an aluminum casting apparatus (having a movable plunger), an injection molding machine (having a movable screw), machining operations, etc.

Figure 7C:
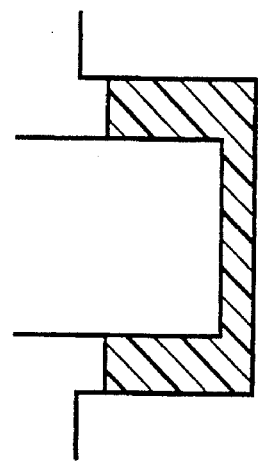
FIG. 7a–7c are a schematic illustration of the cold extrusion process.
Figure 7B:
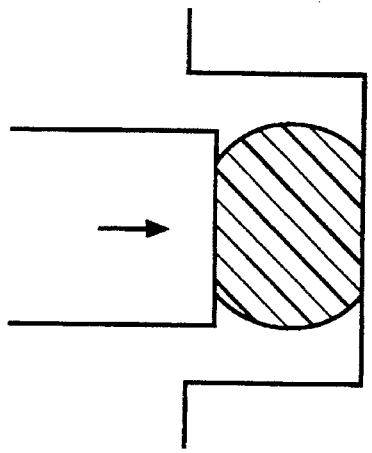
Figure 7A:
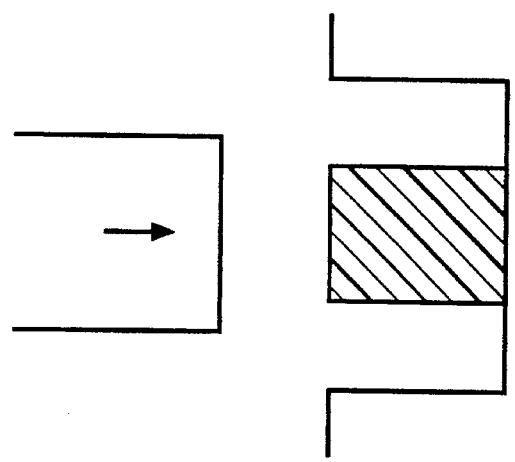

An example of an application of the present invention is the cold extrusion process, as shown in FIG. 7. FIG. 7a shows a metal billet just prior to extrusion. FIG. 7b shows the metal billet under elastic deformation, and FIG. 7c shows plastic flow of the metal billet.

Figure 8:
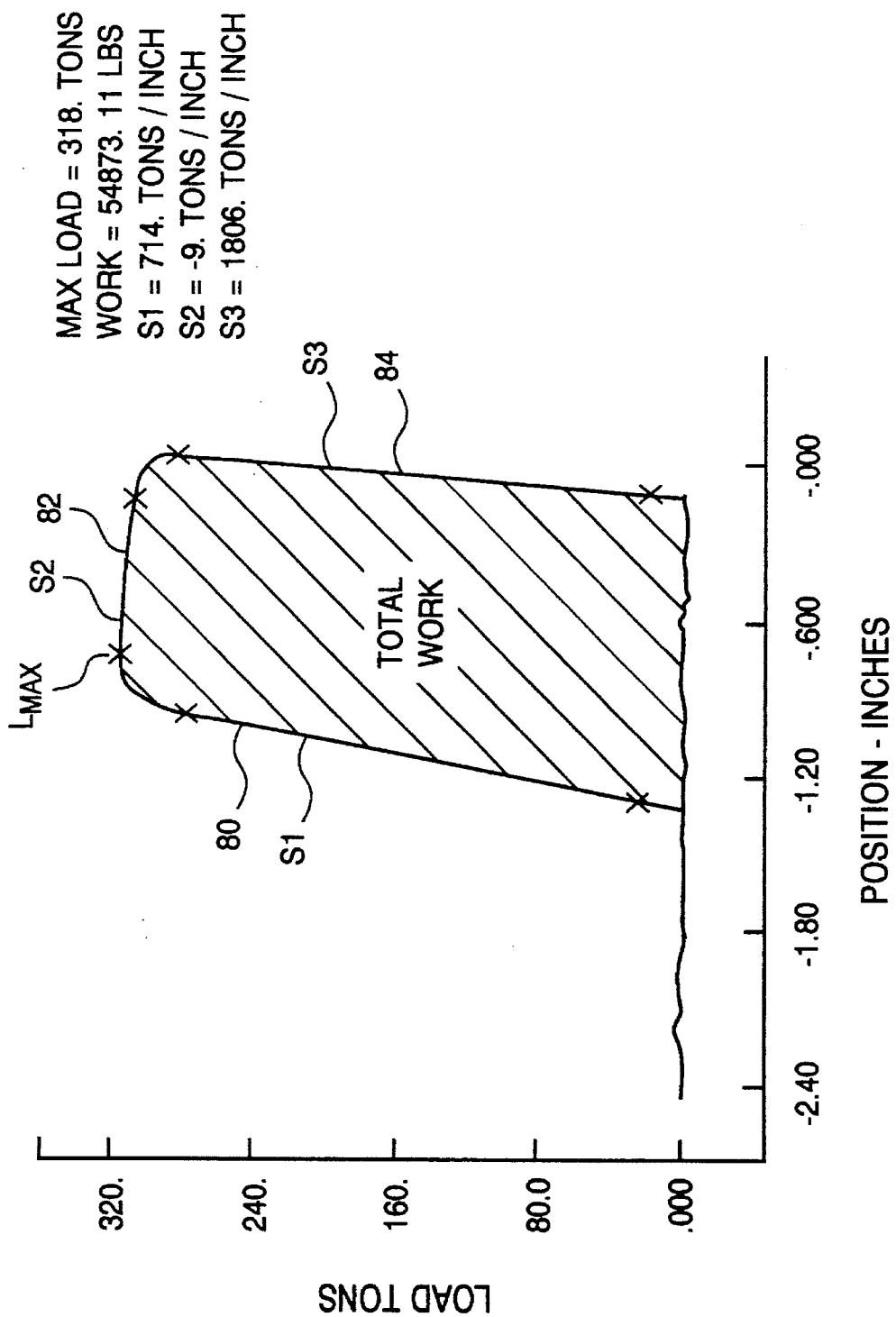
FIG. 8 is a graphical illustration of load versus punch position for a cold extrusion process in accordance with the present invention.

Referring now to FIG. 8, a graphical illustration of punch load versus punch position is provided. During the 80 portion of the curve (having slope S1), the billet is under elastic deformation. After the maximum load is reached, the billet deforms plastically in the 82 portion of the curve (having slope S2). During the 84 portion, there is some elastic return of the metal (having slope S3). In this graph, slope S1 is a function of the cold elastic modulus of the metal, slope S2 is a function of the formability of the metal, slope S3 is a function of the hot elastic modulus of the metal, and the area between the 80, 82 and 84 curves represents the total work.

Figure 9:
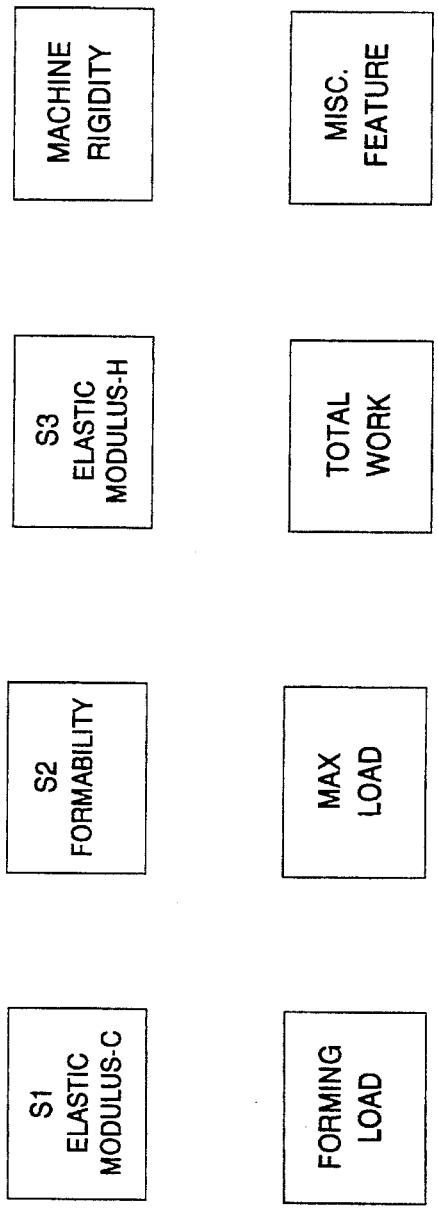
FIG. 9 is an illustration of a screen display for a manufacturing process monitoring system in accordance with the present invention.

Referring now to FIG. 9, a screen display is illustrated for a cold extrusion manufacturing process monitoring system. The eight boxes shown in FIG. 9 illustrate eight features monitored for a cold extrusion process in accordance with the present invention. The eight features include elastic modulus (cold), formability, elastic modulus (hot), machine rigidity, forming load, maximum load, total work, or other miscellaneous features. These specific features may be monitored in the same manner as described above for the metal stamping process.

Figure 10:
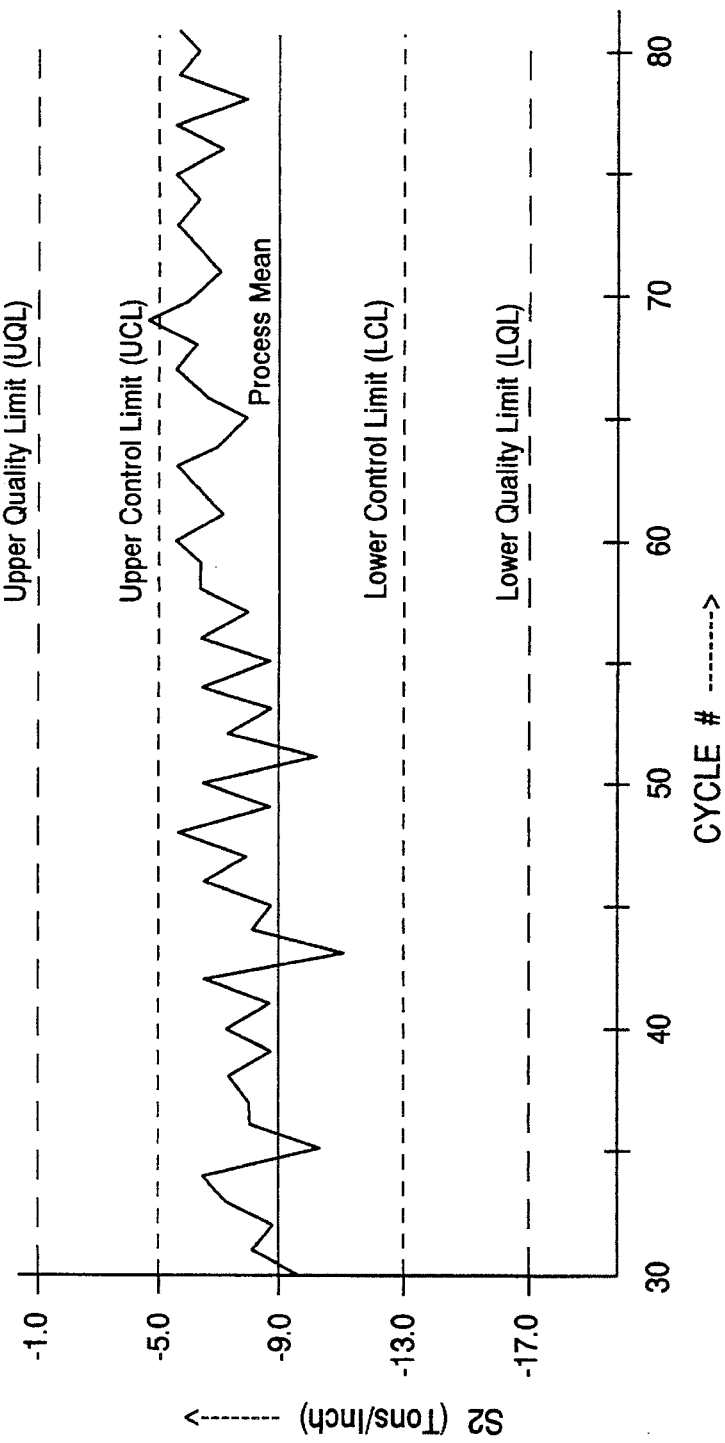
FIG. 10 is an illustration of a screen display of a statistical process control (SPC) chart in accordance with the present invention.

For example, if the user were to choose slope S2 (formability) as the feature to observe, the user would have access to the SPC Chart screen display illustrated in FIG. 10. FIG. 10 shows a graphical illustration of formability (tons/inch) versus cycle. When formability exceeds the upper control limit, the system will recognize that the process is out of control.

Figure 12:
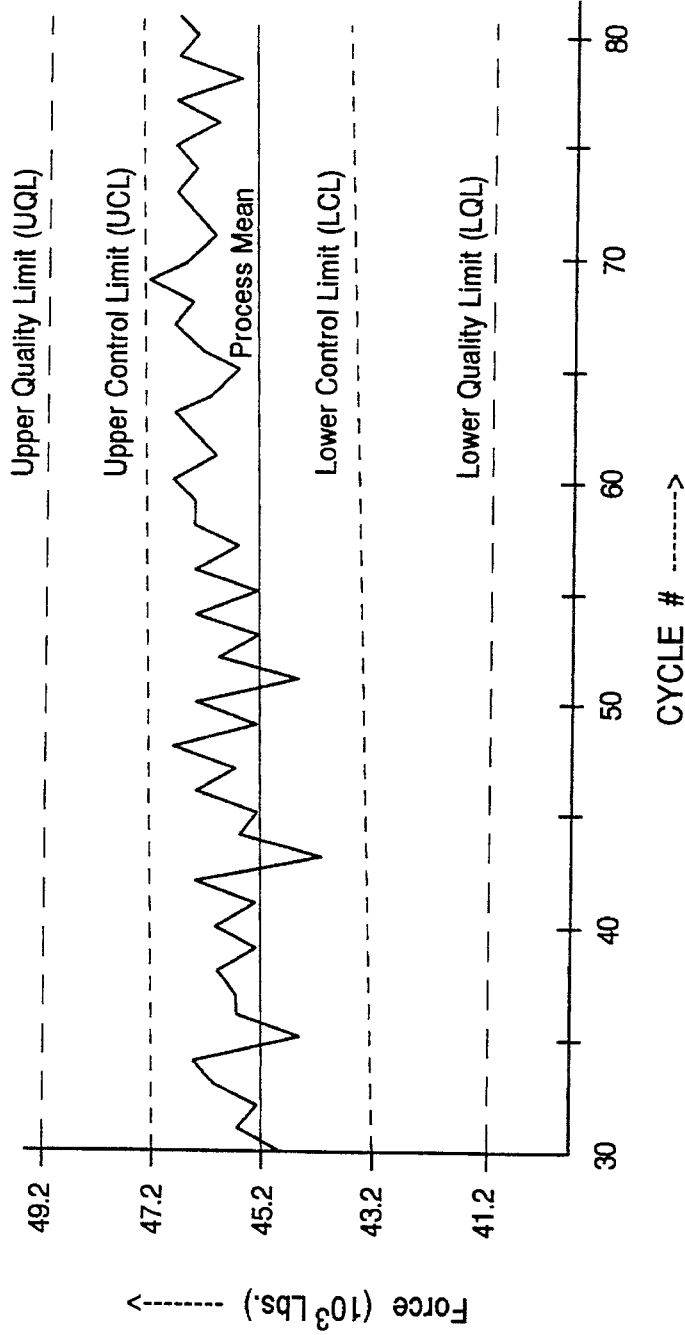
FIG. 12 is an illustration of a screen display of an SPC Chart for monitoring gear broaching in accordance with the present invention.
Figure 13:
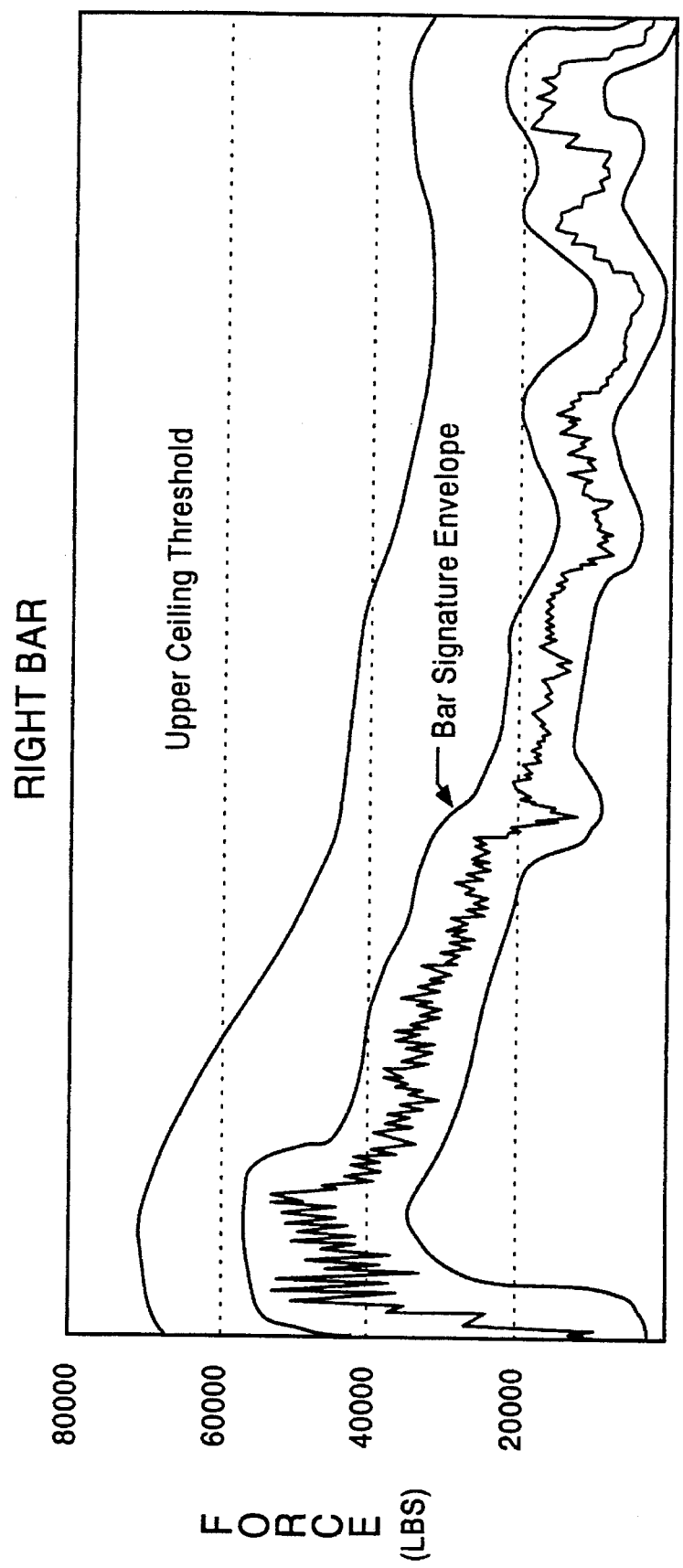
FIG. 13 is a graphical illustration of a bar signature envelope in accordance with the present invention.

Similarly, with reference to FIG. 11, a gear broaching process may be monitored with a system in accordance with the present invention. FIG. 11 illustrates a screen display for monitoring a gear broaching operation. The 128 rows of teeth of the broaching bar are each represented by a box in FIG. 11. For purposes of this example, row 13 is being monitored. Referring to FIG. 12, a graphical display of force versus cycle number is illustrated. Using this information, a bar signature envelope, as shown in FIG. 13, may be developed. The area under the curve represented in FIG. 12 and FIG. 13 represents the total work performed. As a row of teeth wears, the peak load experienced by that row of teeth will increase, and the work will increase accordingly.

In monitoring such an operation, one feature to be monitored would be the ratio of peak force to area. Since the peak force increases as a row of teeth wears, monitoring the ratio of peak force to area under the curve will allow a user to know when the row of teeth is worn or has failed. Another feature to be monitored would be the work which is represented by the area under the curve. As the curve moves up, the work increases, which indicates that the row of teeth is wearing. Accordingly, control limits can be established under which the process is in control, and the teeth are not unduly worn.

The present invention further contemplates monitoring other processes, such as die casting and injection molding. In die casting, plunger position may be monitored versus pressure or temperature, and certain features may be extracted and monitored to determine whether the process is in control and producing quality parts. Similarly, in injection molding, screw position may be monitored versus temperature or pressure, and certain features may be extracted and monitored to determine if the process is under control or producing quality parts.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

We claim:

1. A method of monitoring the operation of a machine having a traversing tool, the machine adapted for forming parts, the method comprising:

operating the machine so as to produce a predetermined number of production parts while collecting a set of production process signatures for each part;

defining a plurality of features for each set of production process signatures, each feature representing a parameter incapable of being directly measured by a single sensor associated with the process of forming the parts;

extracting feature values from each set of production process signatures in real time to obtain a corresponding set of production feature values; and comparing each set of production feature values to predetermined operating limits representing limits within which the process is in control or producing acceptable parts.

2. The method of claim 1 further comprising detecting an out-of-control process or the formation of unacceptable parts based on the comparison.

3. The method of claim 2 further comprising operating the machine so as to produce a predetermined number of baseline parts while collecting a set of baseline process signatures for each part; and establishing the predetermined operating limits associated with each of the features based on the baseline process signatures for each part.

4. The method of claim 3 wherein the predetermined operating limits include control limits and quality limits, the control limits indicating the process of forming the parts is out of statistical control, the quality limits indicating when a part is out of acceptable tolerances.

5. The method of claim 4 wherein the step of detecting includes the step of diagnosing the out-of-control process or the production of unacceptable parts at the actual formation of the parts based on the comparison so as to reduce scrap.

6. The method of claim 5 further comprising controlling operation of the machine upon diagnosing the out-of-control process or the formation of unacceptable parts.

7. A method of monitoring the operation of a machine having a traversing tool, the machine adapted for forming parts, the method comprising:

operating the machine so as to produce a predetermined number of baseline parts while collecting a set of baseline process signatures for each part;

defining a plurality of features based on the set of baseline process signatures for each part, each feature representing a parameter incapable of being directly measured by a single sensor associated with the process of forming the parts;

establishing operating limits associated with each of the features based on the set of baseline process signatures, the operating limits representing limits within which the process is in control or producing acceptable parts;

operating the machine so as to produce a plurality of predetermined number of production parts while collecting a set of production process signatures for each part;

extracting feature values from the set of production process signatures in real time to obtain a corresponding set of production feature values;

comparing the production feature values to the operating limits; and detecting an out-of-control process or the formation of unacceptable parts based on the comparison for the purposes of process control.

8. The method of claim 7 wherein the predetermined operating limits include control limits and quality limits, the control limits indicating the process of forming the parts is out of statistical control, the quality limits indicating when a part is out of acceptable tolerances.

9. The method of claim 8 wherein the step of detecting includes the step of diagnosing the production of unacceptable parts at the actual formation of the parts based on the comparison so as to reduce scrap.

10. The method of claim 9 further comprising controlling operation of the machine upon detecting the formation of the unacceptable parts.

11. For use with a machine having a traversing tool, the machine adapted for forming parts, the system comprising:

means for collecting a set of production process signatures while the machine is operating and producing a predetermined number of production parts;

means for defining a plurality of features based on the set of production process signatures, each feature representing a parameter incapable of being directly measured by a single sensor associated with the process of forming the parts;

means for extracting feature values from the set of production process signature in real time to obtain production feature values; and means for comparing the production feature values to predetermined operating limits in real time, the operating limits representing limits within which the process is in control or acceptable parts are formed, for the purpose of process control.

12. The system of claim 11 further comprising means for detecting an out-of-control process or the formation of unacceptable parts based on the comparison.

13. The system of claim 12 further comprising:

means for collecting a see of baseline process signatures while the machine is operating and producing a predetermined number of baseline parts; and means for establishing the operating limits associated with each of the features based on the set of baseline process signatures for each part.

14. The system of claim 13 wherein means for establishing the operating limits includes means for establishing control limits and means for establishing quality limits, the control limits indicating the process of forming the parts is out of acceptable tolerances.

15. The system of claim 14 wherein the means for detecting includes means for diagnosing the out-of-control process or means for diagnosing the production of unacceptable parts at the actual formation of the parts so as to reduce scrap.

16. The system of claim 15 further comprising means for controlling operation of the machine upon diagnosing the out-of-control process or the formation of the unacceptable parts.

* * * * *